Patented Sept. 25, 1951

2,569,301

UNITED STATES PATENT OFFICE 2,569,301

MANUFACTURE OF THERMOSETTING RESINS AND MOLDING COMPOSITIONS FROM WALLABA RESIN

Harry Ronald Fleck, Biggin Hill, and George Berthold Edward Schueler, North Finchley, London, England No Drawing. Application May 16, 1949, Serial No. 93,636. In Great Britain May 31, 1948

11 Claims. (Cl. 260—17.2)

This invention relates to the manufacture of thermosetting resins and moulding compositions containing the same.

The wallaba tree (*Eperua falcata*, and probably other species of the genus Eperua) is a native of British Guiana where it forms a considerable proportion of the immense forests. The wood of this tree has not yet found much use except as firewood.

The wood is very rich in natural resin, although the content varies considerably according to season, age of tree, and the individual tree. The resin content may be up to 35% of the dry wood, but is generally considerably less, and may be as low as 10%. The resin itself is very different from the usual wood-resins, being to some extent phenolic in character.

We have found that, due to its special character, the resin reacts with aldehydes to form thermosetting resins.

If ordinary wood, even resin-rich wood, such as pine wood, is heated with aldehydes, no thermosetting resin is formed. Mouldings may be obtained due to the resin content if sufficiently high, acting as a thermoplastic binder, but the moulding may be ground and remoulded, and the resin extracted with solvents. If, on the other hand, wallaba wood is used, a thermoset moulding is obtained which cannot be remoulded, and from which none or very little resin can be extracted.

Our invention consists broadly therefore in the manufacture of thermosetting resins and moulding compositions containing the same by treating the resin of wallaba wood with an aldehyde.

The wallaba wood resin which is treated may have been previously extracted, e. g. by solvent extraction, or it may be treated whilst in the wood. In the latter case the wood is disintegrated, e. g. ground or shredded, and treated with the aldehyde so that a wood-filled moulding composition is directly produced.

The aldehyde may be liquid or solid. In the latter case, e. g. when paraformaldehyde is used, the treatment of the wood may consist in merely mixing the disintegrated wood with paraformaldehyde, together with such other ingredients as may be desired, so as to produce a potentially reactive moulding composition.

Catalysts of the kind known to promote the condensation of phenols with aldehydes may be added.

In order to distribute the resin more uniformly and thus expose it more completely to the reaction with the aldehyde, it is useful, especially when the wallaba wood is used as such, to add a solvent for the wood resin, e. g. ethylene glycol, acetone, diacetone alcohol, the petroleum fraction known as white spirit, or ethylene glycol-monoethylether.

Instead of or in addition to using an aldehyde as such there may be used a substance yielding an aldehyde. An example of this is a resinous condensation product, containing an excess of an aldehyde, made from the aldehyde and a compound which produces therewith a thermosetting resin. Such a condensation product is, for example, one produced from urea and formaldehyde, or from phenol and formaldehyde, and which contains excess formaldehyde.

The following examples illustrate the invention, the parts mentioned being parts by weight unless otherwise stated:

Example 1

100 parts of ground wallaba wood, containing about 15 parts resin, is intimately mixed with 9 parts of paraformaldehyde. There is thus obtained a moulding composition capable of producing useful mouldings under the usual moulding conditions (herein understood to mean hot-pressing for 3–6 minutes at a temperature of 340–370° F. and a pressure of 1.25 tons per square inch). By the addition of 1 part of hexamethylene tetramine the quality of the moulding is slightly improved.

If ordinary pinewood flour were treated in the above way no moulding would be obtained.

Example 2

Example 1 is repeated but 5 parts of ethylene glycol are added. The ethylene glycol acts as a solvent and distributes the resin more equally so that a more homogeneous moulding powder is obtained. In this case the flow properties of the composition are much improved, and even when using 3 parts of paraformaldehyde a good and practically useful moulding is obtainable. When using 5.5 parts of paraformaldehyde the mouldings are excellent, having a good gloss and being free from blisters.

The addition of 1 part of hexamethylene tetramine does not significantly improve the moulding.

Substantially the same results are obtained if, instead of ethylene glycol, there is used another solvent such as hereinbefore mentioned.

Example 3

100 parts of wallaba wood are heated under reflux for 2 hours with 100 parts of acetone, 25 parts of 40% formaldehyde solution and 2 parts of oxalic acid as catalyst. The acetone and water are removed by distillation, and the composition ground up and mixed with 1% hexamethylene tetramine, 0.5% stearic acid as mould lubricant, and 0.5% magnesium oxide. The powder is hot rolled for a few minutes to pre-cure and homogenize, and after cooling, is ground up.

Excellent mouldings are obtained under the usual moulding conditions.

Example 4

The quality of the moulding powders, especially the flow, may be further improved by using wallaba wood richer in resin, or by adding resin extracted from the wood to the wallaba wood ordinarily containing 15% resin as used in the previous examples. The resin may be extracted from the wood either with solvents, such as alcohols, including polyhydroxy alcohols, e. g. ethylene glycol; ketones such as acetone, methylethyl ketone; aldehydes such as furfuraldehyde, ethers, e. g. Cellosolve ethyl ether; esters and the like; or with watery solutions of caustic alkalies or ammonia, and afterwards precipitating the resin by means of an acid.

80 parts of wallaba wood are mixed with 8 parts of wallaba resin (extracted as above), 6 parts of paraformaldehyde and 5 parts of ethylene glycol. A suitable quantity, e. g. 1–3% of a plasticising agent such as tricresylphosphate, may be added to improve the flow properties of the moulding composition. The mixture is milled for a few minutes on steam heated rollers, cooled and ground.

The mouldings obtainable from this powder are superior to those previously described with respect to flow, gloss and strength.

Example 5

100 parts wallaba wood containing 15% resin are mixed with 5, 10 and 15 parts, respectively, (calculated as solids), of a ureaformaldehyde resin known as Epok U 900 (registered trademark of British Resin Products Ltd.), and milled on hot rollers for a few minutes.

In the first case (using the 5 parts) useful mouldings are obtainable. In the other cases (using the 10 or 15 parts) the mouldings are excellent. It is to be noted that the urea formaldehyde resin has an excess of formaldehyde which excess evidently reacts with the wallaba resin to produce a thermosetting resin increasing the total amount of resin.

The moulding temperatures employed may be somewhat lower than usual.

Example 6

Example 5 is repeated but replacing the urea-formaldehyde resin by equal amounts of any hardenable phenol-aldehyde condensation product. Equally good mouldings are obtainable, being superior to those of Example 5 in water resistance.

Example 7

50 parts of wallaba resin, obtained by solvent extraction from wallaba wood, are mixed with 50 parts of furfuraldehyde, 100 parts Cellosolve and 1 part triethanolamine, and boiled under reflux for 1 hour. The solvent and excess furfuraldehyde are removed by distillation under reduced pressure, leaving a dark viscous syrup having thermosetting properties.

Amongst many other applications of products produced as hereinafter described, there may be mentioned the manufacture of boards from the moulding compositions obtained by the treatment of wallaba wood and moulded under heat and pressure in moulds designed for the production of sheets varying in thickness from, say 1/8 inch to 1/2 inch. The boards so produced are rigid, have little if any tendency to warp and have very good water resistance. They are suitable for use in any of the accepted applications of hardwood boards for the building and allied trades. The density of the resulting boards may be varied within wide limits by varying the state of subdivision of the wallaba wood, the moulding pressure, and-or the weight of the charge fed to the mould.

We claim:

1. Process for the manufacture of thermosetting resin preparations by treating the resin extracted from wallaba wood with formaldehyde.

2. Process for the manufacture of thermosetting resin preparations by treating the resin extracted from wallaba wood with paraformaldehyde.

3. Process for the manufacture of a moulding composition by treating disintegrated wallaba wood with an aldehyde.

4. Process for the manufacture of a moulding composition by treating disintegrated wallaba wood with formaldehyde.

5. Process for the manufacture of a moulding composition by treating disintegrated wallaba wood with paraformaldehyde.

6. Process for the manufacture of moulding compositions by treating disintegrated wallaba wood with a phenol-aldehyde condensation product, containing an excess of aldehyde.

7. Process for the manufacture of moulding compositions by treating disintegrated wallaba wood with an aldehyde, there being present during the treatment a solvent for the resin of wallaba wood.

8. Process for the manufacture of moulding compositions by treating disintegrated wallaba wood to which resin extracted from wallaba wood has been added, with an aldehyde.

9. Process for the manufacture of moulding compositions by treating disintegrated wallaba wood to which resin extracted from wallaba wood has been added, with paraformaldehyde.

10. A preparation containing a reaction product of wallaba wood resin and an aldehyde.

11. Process for the manufacture of thermosetting preparations by treating the resin extracted from wallaba wood with furfuraldehyde.

HARRY RONALD FLECK.
GEORGE BERTHOLD EDWARD SCHUELER.

No references cited.